United States Patent [19]

James

[11] Patent Number: 4,463,489

[45] Date of Patent: Aug. 7, 1984

[54] UNIVERSAL JOINT PULLER

[76] Inventor: William G. James, 855 Rte. 113, Harleysville, Pa. 19438

[21] Appl. No.: 461,758

[22] Filed: Jan. 28, 1983

[51] Int. Cl.[3] .............. B23P 19/04

[52] U.S. Cl. .............. 29/259; 29/261

[58] Field of Search .............. 29/257, 258, 259, 260, 29/261, 264; 269/130–132

[56] References Cited

U.S. PATENT DOCUMENTS

| | | | |
|---|---|---|---|
| 1,620,211 | 3/1927 | Jarabek | 29/261 |
| 2,074,649 | 3/1937 | Herkimer | 29/261 |
| 3,846,891 | 11/1974 | Elg | 29/261 |
| 3,902,236 | 9/1975 | Deem | 29/259 |
| 3,986,242 | 10/1976 | Kerr | 29/261 |
| 4,019,233 | 4/1977 | Jirele | 29/261 |

*Primary Examiner*—Robert C. Watson
*Attorney, Agent, or Firm*—Diller, Ramik & Wight

[57] ABSTRACT

This disclosure relates to a universal joint puller for disassembling a universal joint including its cross, bearing cups and bearings from drive shaft and/or transmission shaft yokes, the puller including a pair of members at least one of which is mounted for sliding movement relative to a pair of rods, the rods having threaded terminal ends for mounting the puller to threaded bores of associated yokes, a screw for forcing the members away from each other during a disassembly operation, a pair of flexible cables adapted to be entrained about the arms of the universal joint cross, and the ends of each of the cables being connected to the movable member such that upon the rotation of the screw in a direction to separate the members from each other, the force generated by the rotation of the screw is transferred to the cables and the arms of the cross to effect the removal of the bearing cup and its associated bearings, the threaded ends of the rod are preferably removably secured to remaining portions of the rods so that other ends of different diameters can be utilized to secure the puller to yoke bores of different center-to-center distances, and the latter is further augmented by providing elongated slots in the first and second members to change the distances therebetween as dictated by the center-to-center distance of the threaded bores of an associated yoke.

20 Claims, 8 Drawing Figures

FIG.1
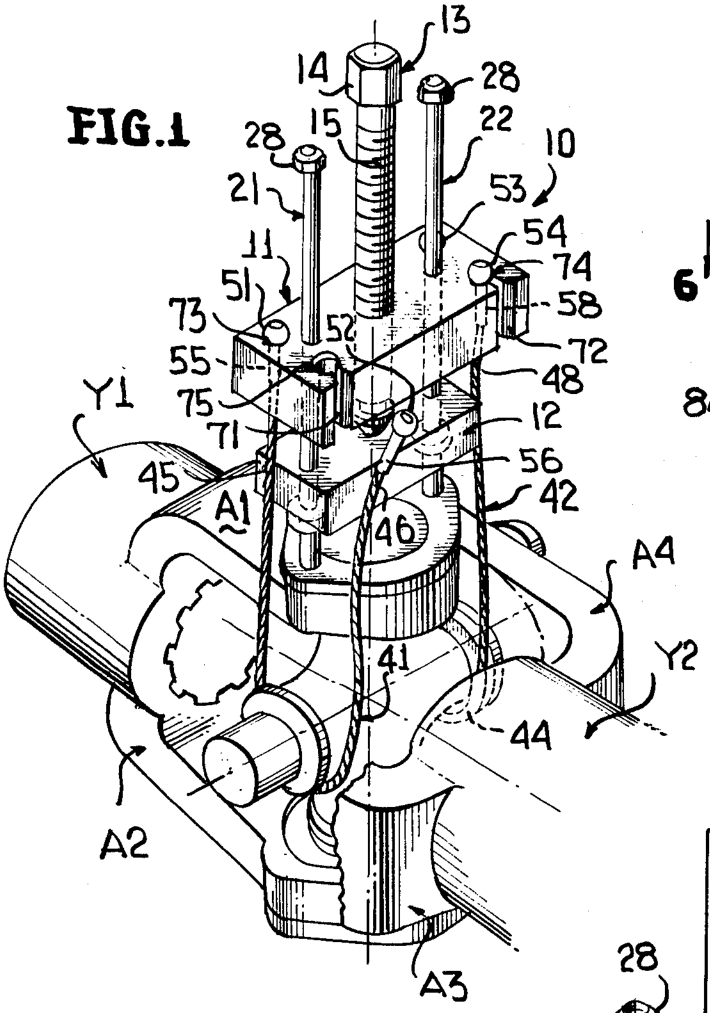
FIG.5
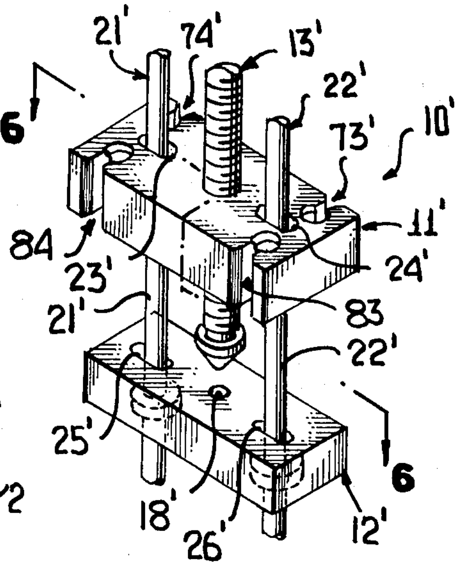
FIG.6
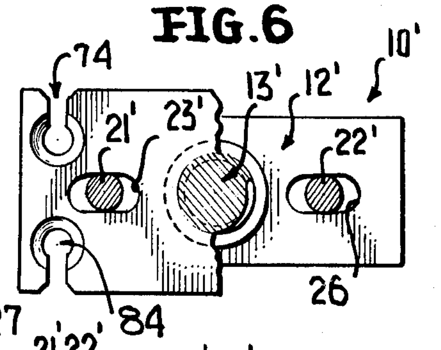
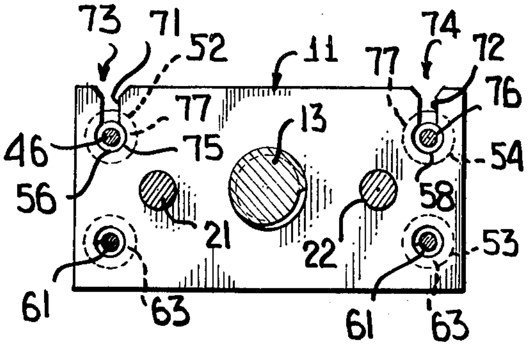
FIG.4
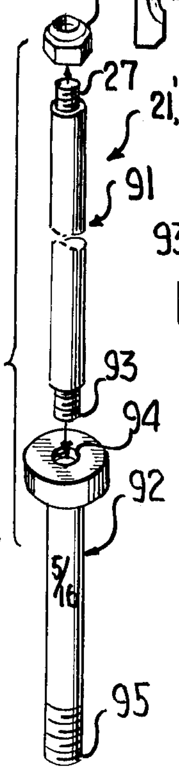
FIG.7
FIG.8
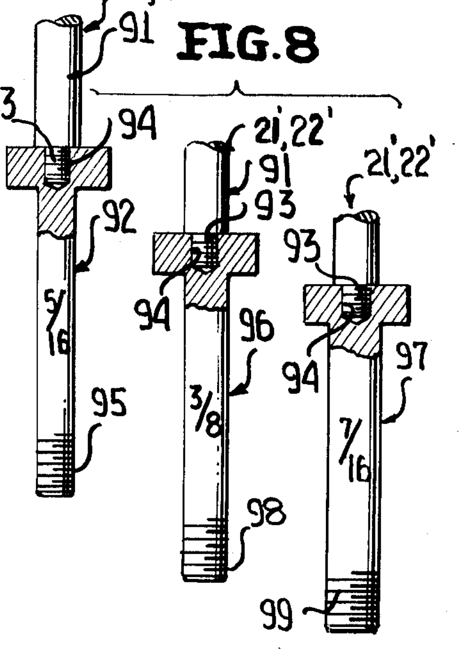

UNIVERSAL JOINT PULLER

Apparatus for disassembling a universal joint of the type which includes a cross having four arms all of which carry bearings and cups from associated bores of transmission and/or drive shaft yokes are relatively well known. Two of such universal joint pullers known to applicant are disclosed in U.S. Pat. Nos. 3,846,891 and 4,019,233 issued on Nov. 12, 1974 and Apr. 26, 1977, respectively, to Carl L. Elg and James E. Jirele, respectively. In both of these patents a screw is utilized to apply a relative force between a pair of movable plates with one of the plates being connected by threaded studs to threaded bores of a drive shaft or universal shaft yoke, while the other member which carries the screw is connected by pivoted arms and connectors/adapters to the arms of the yoke from which a bearing cap is not being removed. While these universal joint pullers are generally effective for their intended purposes, each includes various undesirable characteristics.

As an example, in the Jirele universal joint puller the pivoted arms are connected by hooked ends to bosses of bodies held by screws which screw into threaded yoke collar bores. When the driver screw is rotated, torque tends to twist the pivoted arms which in turn causes undesired and dangerous release of the arm hooks from the bosses. Obviously, even if the latter does not result in injury to equipment or personnel, additional time is wasted in reassembling the arm to the boss from which it became inadvertently disassembled. Moreover, since the load of the driver screw is impressed on the threaded studs which pass through the welded-on flanges of the bearing cups, the latter can undesirably distort resulting in flange/bearing cup/bearing damage. Furthermore, once one yoke and its associated bearing cups and bearings have been removed, other so-called journal caps must be positioned upon the ends of those crossed arms devoid of bearing cups so that the pivoted arms of the puller can be attached thereto to remove the remaining bearing cups. The latter is, obviously, cost ineffective since added so-called journal caps necessarily add to the expense of the puller and its inefficiency of operation time-wise speaking.

The patent to Elg is as advantageous in its practice as the puller of Jirele, while seeking to increase the universal applicablity thereof through separability and adjustability of virtually all of its parts. However, the cumbersome nature of the latter is readily apparent from the patent.

In keeping with the foregoing, a primary object of the present invention is to overcome in a universal joint puller, the disadvantages heretofore noted in the Elg and Jirele patents by providing a novel universal joint puller which is adapted for use without modification to a wide range of universal joint sizes and in use can be rapidly assembled and disassembled relative thereto to remove any one or any number of the bearing cups and associated bearings without intricate adapters and the absence of bearing cup/bearings damage.

In further accordance with this invention, the universal joint puller includes a pair of first and second members, the first of which receives a threaded screw having an end bearing upon the second member, rotation of the screw being utilized to move the first and second members away from each other during a disassembly operation, the first and second members having aligned openings slidably receiving rods which in turn include threaded ends received in threaded bores of drive shaft and/or transmission shaft yokes, the second member being held relatively stationary at a position between the threaded ends of the rods and the first member, a pair of flexible cables each having opposite ends, the cables being adapted to be entrained about arms of the universal joint cross normal to the arm from which a bearing cup is to be removed, first connectors for connecting one end of each cable to the first member, second connectors for connecting another end of each cable to the first member, and at least one of the connectors of the first and second connectors being readily removable to effect rapid assembly and disassembly of the cables and the associated cross arms during a universal joint dissassembly operation.

Still another object of this invention is to provide a novel universal joint puller of the type aforesaid wherein the threaded terminal ends of the rods are separable from remaining portions of the rods such that pairs of threaded ends of different diameters can be utilized to secure the puller to different diameter threaded bores of associated yokes.

Still another object of this invention is to provide a novel universal joint puller as aforesaid wherein the openings or slots of the first and second members which receive the rods are elongated for accommodating different center-to-center distances of threaded bores of associated yokes in the absence of reassembly, disassembly or adaptation of the puller.

Another object of the present invention is to provide a novel universal joint puller as aforesaid wherein an end of each of the cables is fixed to the first member whereas a second end of each of the cables is removably secured to the first member through a keyhole slot therein to permit ready assembly and disassembly of the puller relative to an associated universal joint.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a perspective view with portions broken away of a novel universal joint puller constructed in accordance with this invention, and illustrates a pair of members having openings slidably receiving a pair of rods whose lower threaded ends are secured in threaded bores in an associated yoke and a pair of cables connected to a first of the members and entrained about arms of the universal joint cross.

FIG. 4 is a cross-sectional view taken generally along line 4—4 of FIG. 3, and illustrates details of the first member including a pair of keyhole slots for removably connecting an end of each of the cables thereto.

FIG. 5 is a fragmentary perspective view of a modified form of the invention, and illustrates a pair of elongated slots in each of the members for altering the center-to-center distance between the rods for different center-to-center distances between the threaded bores of different yokes.

FIG. 6 is a slightly enlarged sectional view taken generally along line 6—6 of FIG. 5, and illustrates one of two pair of oppositely opening keyhole slots in the first member for removably securing thereto both ends of each of the pair of cables.

FIG. 7 is a perspective view of a modified rod of the invention, and illustrates a lower threaded end portion which is threadedly connected by a threaded bore and a threaded stem to a remaining portion of the rod.

FIG. 8 is a side elevational view partly in cross-section of the rod of FIG. 7 and two other rods all differing in the diameter of the threaded terminal end to adapt the puller to yoke bores of different threaded diameters.

Figure 2:
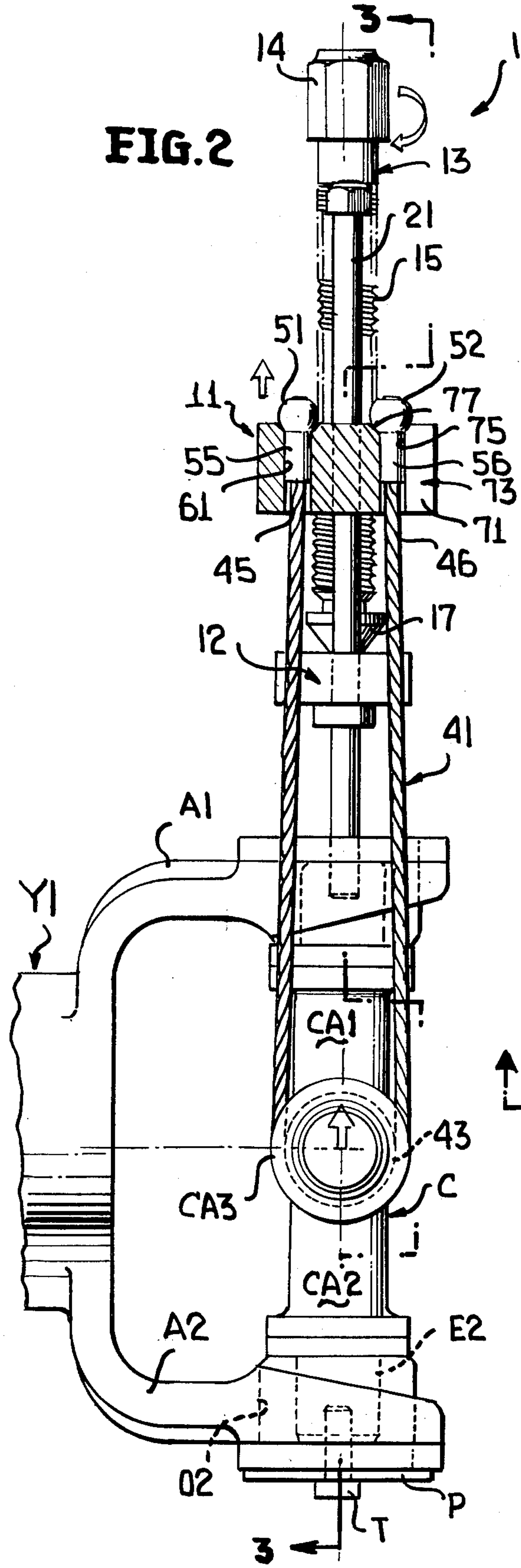
FIG. 2 is a side elevational view looking from left-to-right in FIG. 3 with portions thereof broken away for clarity, and illustrates the manner in which the puller is assembled to one of the yokes with one of the cables entrained about one of the crossed arms.
Figure 3:
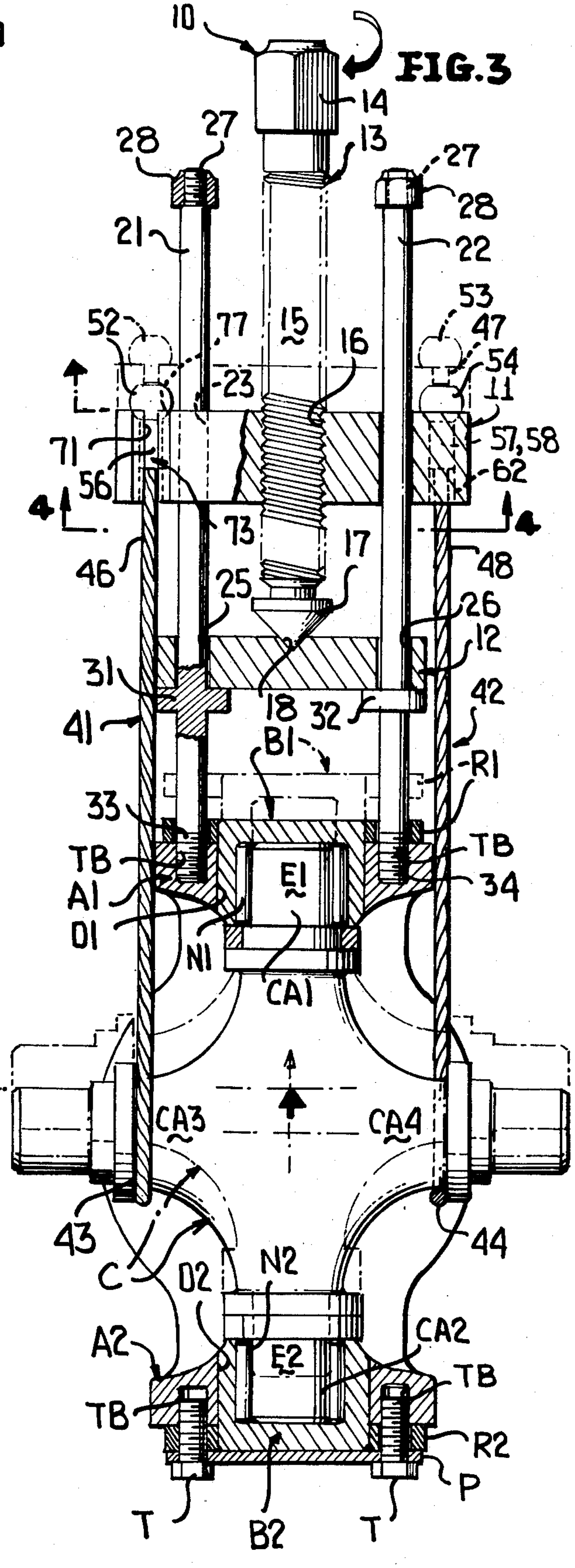
FIG. 3 is a cross-sectional view taken generally along line 3—3 of FIG. 2, and illustrates between the solid and phantom outline positions the manner in which upon the rotation of the main screw the members are moved apart to effect bearing cup removal from an associated yoke.

A novel universal joint puller constructed in accordance with this invention for disassembling (and assembling) a universal joint is fully illustrated in FIGS. 1, 2 and 3 of the drawings and is generally designated by the reference numeral 10.

The universal joint puller 10 is associated with and illustrated attached to a pair of conventional drive shaft and/or transmission shaft yokes Y1 and Y2, each having respective pairs of arms A1, A2; A3, A4 which have openings O1, O2, for example (FIG. 3), for receiving therein respective bearing cups B1 and B2. The bearing cups B1, B2 include conventional needle bearings N1, N2 which are in rolling contact with ends E1, E2, respectively, of cross arms CA1 and CA2 of a universal joint cross or spider C which includes two other cross arms CA3 and CA4 which are shown in FIGS. 2 and 3 after the associated yoke Y2 and its associated bearing cups and bearings (not shown) have been removed. The bearing cups B1, B2 have welded thereto annular rings R1, R2, respectively, and normally a locking plate P (FIG. 3) overlies the same and is secured thereto by threaded bolts T which pass through openings (unnumbered) in the plate P, through openings (also unnumbered) in the rings R1 and R2, and are threaded in threaded bores TB in the arms A1 through A4. As is most apparent from FIG. 3, the threaded bolts T and the plate P have been removed relative to the yoke arm A1 prior to the assembly of the universal joint puller thereto, as will be described more fully hereinafter.

The universal joint puller 10 includes first and second relatively movable members or plates 11, 12, respectively, which are adapted to be moved between a first position adjacent each other, shown in solid outline in FIG. 3, and a second more remote or spaced position which is shown in phantom outline in this same Figure. Means in the form of a screw 13 having a hex head 14 and a threaded shank 15 is threaded in a threaded through bore 16 of the member 11 for applying the force between the first and second members 11, 12, respectively, to move the same between the first and second positions heretofore noted incident to removing the bearing B1, for example, from the opening O1 of the arm A1. A lower end portion (unnumbered) of the screw 13 terminates in a conical head 17 which seats in an upwardly opening conical recess 18 of the second member 12 whereby upon appropriate direction or rotation of the screw 13, the member 11 will move away from the member 12 and this force will be transmitted to the cross C in a manner to be described more fully hereinafter.

A pair of rods 21, 22 pass through respective bores 23, 24 of the member 11 and through respective bores or slots 25, 26 of the member 12. The bores or slots 23, 25 and 24, 26 are in alignment and serve to guide the sliding motion of the first member 11 relative to the rods 21, 22.

Upper ends of the rods 21, 22 are threaded, as indicated by reference numeral 27, and appropriate nuts 28 are fastened thereto. The rods 21, 22 also include integral annular means or shoulders 31, 32 for underlyingly supporting the member 12. The rods 21, 22 further end in threaded terminal ends or end portions 33, 34, respectively, which are threaded into the threaded bores TB of the various yokes, such as the yoke A1 of FIG. 3, to support the puller 10 in its operative position (FIGS. 1 through 3).

A pair of flexible cables 41, 42 include respective medial or bight portions 43, 44 and ends 45, 46; 47, 48. Each of the ends 45 through 48 has crimped thereto an enlarged head 51 through 54, respectively, through an associated crimped tubular stem 55 through 58, respectively. The heads 51, 53 and their associated stems 55, 57 are crimped to the respective cables 41, 42 before the heads 52, 54 and respective stems 56, 58 are attached thereto. This permits the ends 46, 48 of the respective cables 41, 42 to be threaded downwardly through bores or openings 61, 62 formed in the member 11 each of which has a shallow conical counter bore or seat 63 (FIG. 2). The heads 51, 53 are larger than and thus are retained upon the seats 63, and thereafter the heads 52, 54 and the associated stems 56, 58 are crimped to the ends 46, 48 of the respective cables 41, 42. The stems 56, 58 are removably secured to the first member 11 by sliding the stems 56, 58 into elongated slot portions 71, 72 of respective keyhole slots 73, 74 having enlarged bores 75, 76, respectively, each of which has an upwardly facing conical seat 77 upon which is adapted to rest the heads 52, 54, respectively, as is best indicated in FIGS. 2, 3 and 4 of the drawings.

The universal joint puller 10 is utilized in the manner most evident from FIGS. 1, 2 and 3 of the drawings by first removing, for example, the retaining or locking plates, corresponding to the plate P (FIG. 3) from the particular yoke arm A1 through A4 from which the particular bearing cup, its retainer, and its needles are to be removed, as, for example, the bearing cup B1, the retainer R1 and the associated needles N1 (FIG. 3). Once the retaining or locking plate associated therewith has been removed, the rods 21, 22 are threaded into the threaded bores TB through the end portions 33, 34, again as is best illustrated in FIG. 3. At this time, the threaded screw 13 has been retracted sufficiently such that the first member 11 is relatively close to the second member 12, thus assuring that a sufficient length of the cables 41, 42 is available for entrainment about the cross arms CA3 and CA4 and, of course, allow the sleeves and heads 56, 58 and 52, 54, respectively, to be received in the keyhole slots 73, 74. It is to be noted in particular that when the cables 41, 42 are entrained about the cross arms CA3 and CA4, the bight portions 43, 44 are inboard of the arms A3, A4 and the bearing cups (not shown) associated therewith. Therefore, as the screw 13 is rotated to move the member 11 upwardly from the solid outline position in FIG. 3 to the phantom outline position thereof, the cables 41, 42 impart a force to the cross arms CA3 and CA4 without in any way applying a force particularly to the bearing cups and bearings associated with these arms and in the absence of any type of adapters applied thereto. Hence, due to this direct application of forces to the cross arms CA3 and CA4, the bearing cups and needle bearings associated therewith can not be damaged and the continued progressive increase in force and the movement of the member 11 away from the member 12 loads the cables 41, 42 pulling the cross C upwardly, as viewed in FIGS. 2 and 3 which, of course, forces the bearing cup B1, its retainer R1 and the needle bearings N1 associated therewith upwardly and outwardly of the opening O1 of the yoke arm A1 in the manner generally indicated in phantom outline in FIG. 3. Obviously, continued rotation of the screw 13 to move the member 11 further away from the member 12 results in the eventual total forceful withdrawal of the bearing cup B1, the retainer R1 and the needles N1 from the opening O1 of the arm A1. Once the latter is accomplished, the screw 14 need be but rotated counterclockwise to allow the member 11 to move back toward the member 12 at which time the cables 41, 42 are loosened to permit the removal of the heads 52, 54 from the respective seats 77 and totally from the keyhole slots 73, 74. Thereafter, the rods 21, 22 can be unthreaded from the threaded bores TB of the arm A1 to totally remove the puller 10 therefrom.

It is, of course, possible to utilize the universal joint puller not only to disassemble or remove bearing cups B1, B2, etc., from the associated yoke arm openings, but also to utilize the puller to insert new bearing cups, bearings and retainers therein. In order to accomplish the latter, after the puller 10 has been removed from the arm A1, the new bearing cup and its retainer is slipped on the lower ends of the rods 21, 22 after which the threaded ends 33, 34 are again threaded into the threaded bores TB of the arm A1. Thereafter, the member 12 is raised well above the shoulders 31, 32 after, of course, the screw 13 has been retracted and a one to one-and-a-half inch block of material, such as a conventional drive socket, is positioned between the under surface (unnumbered) of the member 12 and the upper surface (unnumbered) of the new bearing cup replacing the earlier removed bearing cup B1. The cables 41, 42 are, of course, connected to the member 11 and upon rotation of the screw 13 to now spread the members 11, 12, the member 12 will be forced in a downward direction and the cross C will be moved upwardly, thus forcing the end E1 of the cross arm CA1 into the new cap, corresponding to the cap B1, and the latter into the opening O1 of the arm A1. Thus, the puller 10 is equally operable to install or assemble new bearing cups into the openings as well as remove bearing cups therefrom.

The universal joint puller 10 is designed to disassemble/assemble bearing cups relative to universal joints or U-joints of a single or limited size as, for example, the most popular 1700 series U-joint in which the threaded bores TB in each of the arms A1 through A4 is of a predetermined diameter and is of a predetermined center-to-center distance. However, the diameter and the center-to-center distance varies with, for example, the different series of universal or U-joints commonly marketed, such as Spicer universal joints 1600 through 1880. The diameters of the threaded bores TB are 5/16", ⅜", and 7/16" with center-to-center distances ranging between 2 and 5/16 inches to 2 and 13/16 inches. Hence, to accommodate universal joints in the 1600 through 1800 series, the universal joint puller 10 is modified in the manner best illustrated in FIGS. 5 through 8 of the drawings to which attention is now directed with elements corresponding to those of the puller 10 being primed.

The universal joint puller 10' is similar to the puller 10 and includes guide rods 21', 22', a force applying screw 13', an upper or first member 11' and the lower or second member 12'. However, in lieu of the circular bores or openings 23, 24 of the member 11 and the bores or openings 25, 26 of the member 12 of the puller 10, the puller 10' includes elongated slots 23', 24' in the member 11' and like elongated slots 25', 26' in the member 12'. These elongated slots function to permit the relative movement of members 11', 12' toward and away from each other, and also permit the rods 21', 22' to be moved toward or away from each other thereby changing the center-to-center distance therebetween and accommodating the same for differences in center-to-center dimensions or distances of the different universal joint series heretofore noted.

A second difference between the puller 10 and the puller 10' is that the latter includes not but two keyhole slots 73', 74' but two additional keyhole slots 83, 84 corresponding identically to the keyhole slots 73, 74 of the member 11'. Due to the latter construction, the cables 41, 42 can be totally removed from the keyhole slots 73', 74', 83 and 84 of the member 11'. This permits selective assembly ahd disassembly of the cables 41, 42 relative to the member 11' which can be advantageous when removing or disassembling universal joints without disconnecting the yokes Y1, Y2 from the respective drive and/or transmission shafts.

The remaining difference between the puller 10 and the puller 10' is that the latter includes forming the guide rods 21', 22' as two separate elements 91, 92 (FIGS. 7 and 8). In each case the element 91 of each of the rods 21', 22' includes a lower threaded stem 93 which is threadedly received in a threaded bore 94 of the element 92, and the element 92 has a lower thread 95 of a predetermined diameter as, for example, 5/16". Thus, when the threaded bores TB are 5/16" in diameter, the element 92 is threadedly connected by the threaded bore 94 to the thread stem 93 of each of the guide rods 21', 22'. Thereafter, each threaded end 95 is threaded into the like diametered threaded bore TB of the associated arm A1 through A4 and the puller can be utilized as heretofore described. Obviously, the same 5/16" elements 92 can be moved toward or away from each other as dictated by the center-to-center distance between the threaded bores TD by movement of the rods 21', 22' in the elongated slots or openings 23' through 26'.

Generally speaking, as the diameter of the threaded bores TB increase, the center-to-center distance increases and vice versa. However, in most cases, the universal joint 10' can accommodate all U-joints or universal joints between the 1600 series and the 1800 series by utilizing different diametered elements, such as the elements 96 and 97 of FIG. 8 having respective threaded ends 98, 99. The diameter of the threaded ends 98, 99 might be, for example, ⅜" and 7/16", respectively. Thus, if the threaded bore TB of a particular yoke arm A1 is ⅜" in diameter or 7/16" in diameter, the element 92 is simply removed from each of the elements 91 of both rods 21', 22' and the respective elements 96, 97 are secured to each of the rods 21', 22', and the puller 10' is utilized in the manner heretofore described. Thus, by providing two elements 92, two elements 96 and two elements 97, the puller 10' can be utilized for all popular series of universal joints of varying threaded bore TB diameters and varying center-to-center distances. The latter, obviously, further enhances the universal applicability of the puller 10' to existing commonly utilized universal joints.

Although only a preferred embodiment of the invention has been specifically illustrated and described herein, it is to be understood that minor variations may be made in the apparatus without departing from the spirit and scope of the invention, as defined in the appended claims.

What is claimed is:

1. A universal joint puller for disassembling a universal joint including its cross and bearing cups from drive shaft and/or transmission shaft yokes comprising first and second relatively movable members adapted to be moved between a first relatively adjacent position and a second relatively spaced position, means for applying a force between said first and second member to move the same from said first position to said second position incident to removing a bearing cup from an arm of an associated universal joint cross, thread means for connecting said puller to threaded bores of an associated drive shaft or transmission shaft yoke, a pair of flexible cable means for entraining arms of the cross normal to the arm from which a bearing cup is to be removed, each of said pair of flexible cable means having opposite ends connected to said first member whereby upon operation of said force applying means, said movable members are moved from said first position toward said second position with the resultant removal of an associated bearing cup, and means for removably connecting at least one end of each pair of flexible cable means to said first member for rapidly and readily entraining said flexible cable means about and removing the same from cross arms during an universal joint disassembly operation.

2. The universal joint puller as defined in claim 1 including means for holding said second member at a predetermined distance from said thread means whereby the force applying means imparts movement to said first member to move the same from said first position to said second position.

3. The universal joint puller as defined in claim 1 including guide means for relatively guiding the movement of said first and second members during the relative movement thereof between said first and second positions.

4. The universal joint puller as defined in claim 1 wherein said thread means include first and second threads at ends of first and second rods adapted for threaded receipt in respective yoke threaded bores, said first and second rods pass through respective first and second elongated slots in said first and second member, and said elongated slots have aligned axes disposed generally normal to the direction of relative movement between said first and second members whereby said puller can be connected to yokes having threaded bores of different center-to-center distances.

5. The universal joint puller as defined in claim 1 wherein said thread means include at least two pair of threaded members, and said pairs differ in thread diameter whereby differing pairs can be connected to yokes having threaded bores of different diameters.

6. The universal joint puller as defined in claim 1 including means for removably connecting a remaining end of each pair of flexible cable means to said first member for rapidly and readily entraining said flexible cable means about and removing the same from cross arms during a disassembly operation.

7. The universal joint puller as defined in claim 1 wherein said removable connecting means includes key hole slots in said first member each defined by an entrance slit and an enlarged bore, each flexible cable means being sized to freely move through said slit, and each said one end having an enlarged head larger in size than said enlarged bore.

8. The universal joint puller as defined in claim 2 including guide means for relatively guiding the movement of said first and second members during the relative movement thereof between said first and second positions.

9. The universal joint puller as defined in claim 2 wherein said thread means include first and second threads at ends of first and second rods adapted for threaded receipt in respective yoke threaded bores, said first and second rods pass through respective first and second elongated slots in said first and second members, and said elongated slots have aligned axes disposed generally normal to the direction of relative movement between said first and second members whereby said puller can be connected to yokes having threaded bores of different center-to-center distances.

10. The universal joint puller as defined in claim 2 wherein said thread means include at least two pair of threaded members, and said pairs differ in thread diameter whereby differing pairs can be connected to yokes having threaded bores of different diameters.

11. The universal joint puller as defined in claim 3 wherein said thread means include first and second threads at ends of first and second rods adapted for threaded receipt in respective yoke threaded bores, said first and second rods pass through respective first and second elongated slots in said first and second members, and said elongated slots have aligned axes disposed generally normal to the direction of relative movement between said first and second members whereby said puller can be connected to yokes having threaded bores of different center-to-center distances.

12. The universal joint puller as defined in claim 3 wherein said thread means include at least two pair of threaded members, and said pairs differ in thread diameter whereby differing pairs can be connected to yokes having threaded bores of different diameters.

13. The universal joint puller as defined in claim 8 wherein said thread means include first and second threads at ends of first and second rods adapted for threaded receipt in respective yoke threaded bores, said first and second rods pass through respective first and second elongated slots in said first and second members, and said elongated slots have aligned axes disposed generally normal to the direction of relative movement between said first and second members whereby said puller can be connected to yokes having threaded bores of different center-to-center distances.

14. The universal joint puller as defined in claim 9 wherein said thread means include at least two pair of threaded members, and said pairs differ in thread diameter whereby differing pairs can be connected to yokes having threaded bores of different diameters.

15. The universal joint puller as defined in claim 11 wherein said thread means include at least two pair of threaded members, and said pairs differ in thread diameter whereby differing pairs can be connected to yokes having threaded bores of different diameters.

16. The universal joint puller as defined in claim 4 including guide means for relatively guiding the movement of said first and second members during the relative movement thereof between said first and second positions.

17. A universal joint puller for disassembling a universal joint including its cross and bearing cups from driveshaft and/or transmission shaft yokes comprising first and second relatively movable members adapted to be moved between a first relatively adjacent position and a second relatively spaced position, means for applying a force between said first and second members to move the same from said first position to said second position incident to removing a bearing cup from an arm of an associated universal joint cross, a pair of rods carrying said first and second members, each rod having a threaded terminal end for connecting said puller to threaded bores of an associated drive shaft or transmission shaft yoke, said rods having end portions remote from said threaded terminal ends slidably received in openings in said first member, said second member being disposed between said first member and said threaded terminal ends, means for holding said second member stationary at a predetermined distance from said threaded terminal ends whereby the force applying means imparts movement to said first member to move the same from said first position to said second position, a pair of flexible cables each having opposite ends, said cables being adapted to be entrained about arms of the cross normal to the arm from which a bearing cup is to be removed, first connecting means for connecting one end of each cable to said first member, second connecting means for connecting another end of each cable to said first member, and at least one of said first and second connecting means being readily removable to effect rapid assembly and disassembly of said cables and the associated cross arms during a universal joint disassembly operation.

18. The universal joint puller as defined in claim 17 including means for removably securing each said threaded terminal end to a remaining rod portion of its associated rod whereby threaded terminal ends of different thread diameters can be used to connect the puller to yokes having threaded bores of different diameters.

19. The universal joint puller as defined in claim 17 including opening in said second member, said rod end portions being slidably received in said second member openings, said first and second member openings being elongated and having axes disposed generally normal to the direction of relative movement between said first and second members whereby said puller can be connected to yokes having threaded bores of different center-to-center distances.

20. The universal joint puller as defined in claim 18 including opening in said second member, said rod end portions being slidably received in said second member openings, said first and second member openings being elongated and having axes disposed generally normal to the direction of relative movement between said first and second members whereby said puller can be connected to yokes having threaded bores of different center-to-center distances.

* * * * *